Feb. 19, 1929.   D. G. STEELY   1,702,526
AERATING APPARATUS
Filed Sept. 22, 1924
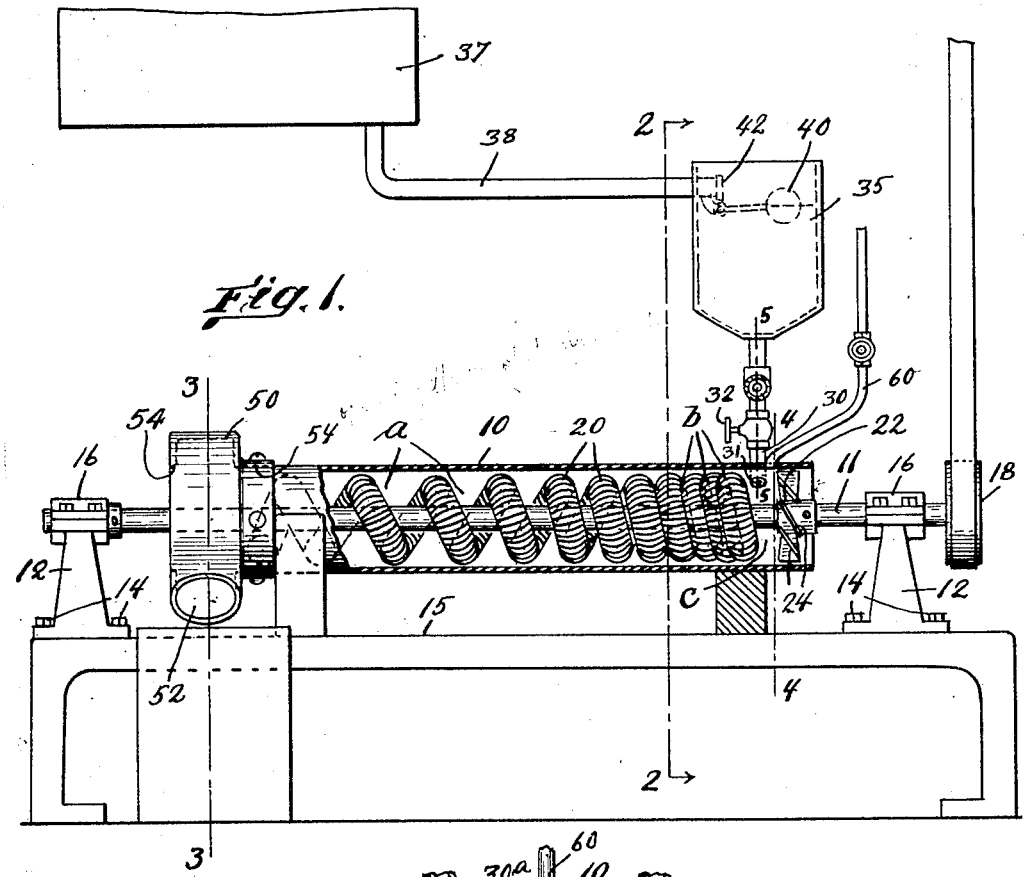
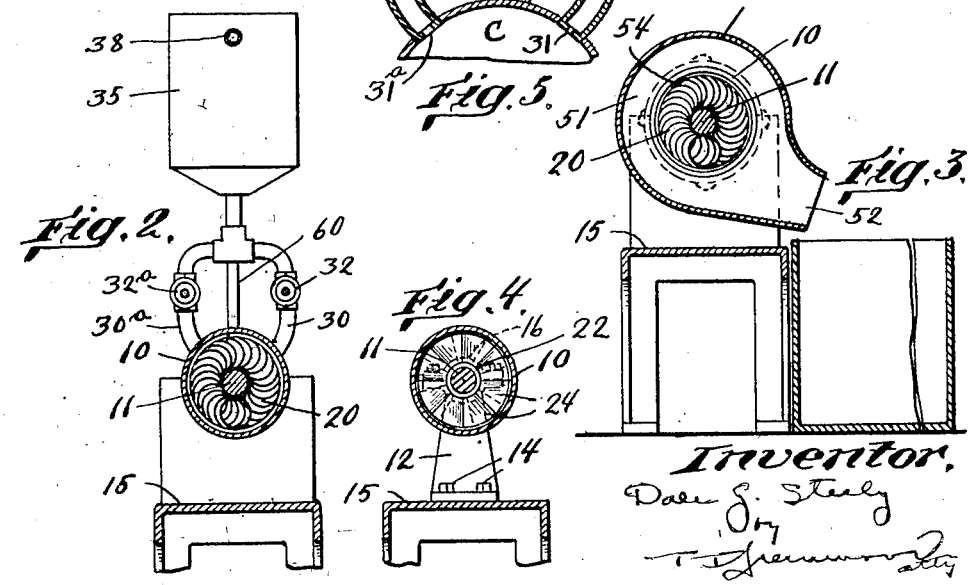

Patented Feb. 19, 1929.

1,702,526

UNITED STATES PATENT OFFICE.

DALE G. STEELY, OF ARLINGTON, MASSACHUSETTS, ASSIGNOR TO W. F. SCHRAFFT & SONS CORPORATION, OF BOSTON, MASSACHUSETTS, A CORPORATION OF MASSACHUSETTS.

AERATING APPARATUS.

Application filed September 22, 1924. Serial No. 739,054.

This invention relates to, and has for an object, a process and apparatus for aerating or beating viscous liquid materials to form a froth or foam in a continuous manner, wherein the material to be aerated is introduced in a continuous manner into the aerating apparatus and is constrained to move in a predetermined direction through the apparatus and is aerated in its passage.

A further object is the provision of means to treat a relatively small quantity of the viscous material with a relatively large amount of air, whereby rapidly and effectively to aereate the material.

A further object is the provision of means to maintain a positive flow of air about and in contact with the material undergoing aeration.

A yet further object is the provision of an aerating apparatus which positively conveys the material undergoing aeration from the entrance to the delivery passage and acts on the material to aerate it, while conveying it.

A further object is the provision of an aerating apparatus having a passage for aerated material the cross-sectional area of which increases from the entrance to the delivery passage, whereby to accommodate the increasing bulk of the material as it becomes aerated.

A yet further object is the provision of means to govern accurately the rate of output of aerated material.

A further object is the provision of an aerating apparatus wherein the bearings for the movable element are entirely removed from the zone of aeration.

A yet further object is generally to improve aerating apparatus.

Fig. 1 is a side elevation, partly in section of a beating apparatus embodying the invention.

Fig. 2 is a sectional elevation along line 2—2 of Fig. 1.

Fig. 3 is a sectional elevation along line 3—3 of Fig. 1.

Fig. 4 is a sectional elevation along line 4—4 of Fig. 1.

Fig. 5 is a sectional detail along line 5—5 of Fig. 1.

The apparatus embodying the invention is particularly adapted, although not necessarily limited, to aerating, or beating, eggs.

The beating apparatus includes a cylinder 10 of substantial length and diameter and preferably open at both ends. The material, as egg solution, is adapted to be introduced in a continuous manner into the cylinder at, say, the right hand end, Fig. 1, and the viscous egg froth is adapted to be discharged from the cylinder at the opposite end. The beating element includes a shaft 11 which is disposed axially within and substantially concentric with the cylinder and is extended outwardly beyond both ends of the cylinder. The extended ends of said shaft are supported rotatably in bearing standards 12, which standards are preferably secured removably, by bolts 14, to the supporting base 15 and may have removable caps 16 by which the shaft may be removably supported in the standards.

When eggs are to be beaten, it is imperative that no oil comes in contact with the egg solution as the froth will not form if the solution contains even a trace of oil and, consequently, the bearings are so far removed from the aerating zone, or from the ends of the cylinder, that the lubricating oil for the shaft bearings is unlikely to come in contact with the material to be aerated.

A pulley 18, or equivalent device, is fixed to the shaft, preferably beyond one of the bearing standards, by means of which the shaft may be rotated. Means are carried by said shaft, within the cylinder, to act upon and whip or beat the material to be aerated and said means preferably is so arranged that it acts also positively to convey the material undergoing aeration from the entrance to the discharge end of the cylinder, and whip the material during its traverse of the cylinder. Said means preferably comprises an open spiral coil 20 of wire of substantial length and diameter, which coil is wound in spiral formation about the major portion of the length of said shaft contained within the cylinder, and is fixed to and is driven with the shaft. The individual turns in said coil, when applied to the shaft, are spaced from each other and form an effective device for whipping the material to be aerated. As the material increases in bulk during the aerating process, I prefer to increase the spacing $a$ between the convolutions of the coil on the shaft, from the entrance to the discharge end of the cylinder, whereby to accommodate the increasing bulk of the material as it takes up the air. At the material-entrance, the convolutions may be close together, or even be inter-linked, as shown at $b$, since the cross-sectional area of the cylinder at the entrance is considerably greater than the volume of the unaerated material introduced within the cylinder.

The convolutions of the coil are also so formed, with relation to the direction of rotation of the shaft 11, that they act as a conveyor to move the material positively from the entrance to the discharge end of the cylinder.

One of the objects of the invention is the provision of means to circulate an abundance of air positively through said cylinder 10 and in contact with the material undergoing aeration. The means may include an impeller 22 which is fixed to the shaft 11 and is disposed within the cylinder 10 at the material-entrance end thereof and preferably spaced from the end of the aerating coil. The impeller may be formed with a plurality of vanes 24 which are so inclined, with relation to the direction of rotation of the shaft 11, that a relatively large quantity of air is drawn in through the open end of the cylinder and is caused to flow therealong and through the whipping coil and its convolutions, and in intimate contact with the material undergoing aeration.

Preferably, the diameter of said impeller is somewhat less than the inner diameter of the cylinder so that the impeller may rotate free from contact with the cylinder yet without undue clearance between it and the cylinder. Preferably, also, the whipping coil is so constructed and arranged that it may rotate free from actual contact with the cylinder and yet be closely spaced therewith.

The viscous material to be whipped or beat is introduced into the cylinder, preferably at the top, in the space $c$ between the forward end of the whipping coil and the impeller; and the impeller serves not only to force air through the cylinder but to prevent the material from escaping through the forward open end of the cylinder.

The material to be beat, usually as a viscous colloidal liquid, is caused to flow in a continuous manner and in a relatively small stream into the cylinder through a pipe 30 which extends through the wall of the cylinder and may terminate in an orifice 31 of predetermined dimensions and the flow of material through the orifice may be controlled by a shut-off valve 32 in said pipe 30.

It is one of the objects of this invention to maintain a constant output of aerated material or froth from the apparatus per unit time. To this end means are provided for maintaining a constant and predetermined inflow of liquid material into the apparatus, and said means may include means to maintain a constant head of material over the calibrated orifice 31 whereby the flow of material into the apparatus will be constant and at a rate determined by the head and the dimensions of the orifice.

The pipe 30 is in communication with a receptacle 35 which is elevated a suitable extent above the orifice 31, and also the discharge end of the tube 10. The liquid material is contained in a supply tank 37 which is elevated above said receptacle 35, and a pipe 38 extends between the two. The liquid is adapted to be maintained at a constant level in the receptacle 35 in a suitable manner as, for instance, a float 40 may be disposed within said receptacle to be buoyed up by and rise and fall with the liquid within the receptacle. Said float may open and close a valve 42 which controls the admission of liquid from pipe 38 and thereby maintains a substantially constant level of liquid in the constant level receptacle.

For certain purposes it may be desirable to increase the output of the apparatus and maintain constant the rate of increased output. For this purpose a second pipe $30^a$ may be arranged for communication with the cylinder and the constant-level receptacle; and said pipe may be provided with a calibrated orifice $31^a$ through which the liquid may flow when the shut-off valve $32^a$ is open. Said orifices may be of the same or different dimensions, and the rate of output of aerated material will depend upon the number of orifices or particular orifice in use.

The aerated material or froth appears at the discharge end of the cylinder 10 as a tube of froth upon the inner face of the cylinder, and the excess air is discharged axially from the interior of the tube of froth into the atmosphere. A hood 50 is attached to the cylinder, at the discharge end, to catch the froth as it issues from the cylinder. Said hood is formed with an approximately annular recess 51 which surounds and is larger than the open end of the cylinder 10 and which is adapted to receive the froth and guide it to the outlet passage 52. Said hood has a lateral opening 54 which is aligned with and is preferably at least as large as the open end of the cylinder and through which excess air may escape to the atmosphere.

A pipe 60 may be arranged to discharge a stream of water into the inlet space $b$ of the cylinder for cleaning purposes and, when desired, the shaft 11 and its whipping coil may be withdrawn through the open end of the cylinder by disconnecting the bearing standards 12 from the base 15, for cleaning purposes.

I claim:

1. A beating device for viscous liquids comprising a tube open at the ends, a fan to pass a large stream of air through the tube, means to introduce a small stream of viscous liquid into the tube and into the air stream from the fan, and a beating device disposed in the tube and extended along the length thereof and having provision for whipping the liquid and air streams into a froth and moving the froth along the tube to the other open end thereof.

2. A beating device for viscous liquids comprising a tube open at the ends, a fan to pass a large stream of air through the tube at one end, means to introduce a small stream of viscous liquid into the tube at the same end and into the air stream from the fan, and a beating device disposed in the tube and extended along the length thereof and having provision for whipping the liquid and air streams into a froth and moving the froth along the tube to the other end thereof, said tube having a lateral discharge opening adjacent said other end through which the froth is adapted to pass.

3. A beating device for viscous liquids comprising a tube open at the ends, a fan to pass a large stream of air through the tube at one end, means to introduce a small stream of viscous liquid into the tube at the same end and into the air stream from the fan, and a beating device including a rotatable shaft disposed within and extended along the length of the tube having whipping elements thereon which whip the liquid and air streams into a froth and move the froth along the tube to the other open end thereof, said shaft being extended through and beyond both open ends of the tube, and bearing-supports for the ends of the shaft disposed remote from the open ends.

4. Beating apparatus for viscous liquids comprising a relatively long straight tubular chamber having an outlet passage at one end and means to introduce air and a stream of the viscous liquid to be aerated at the other end, and a beating device within the chamber arranged to whip the air and viscous liquid into a froth and having such configuration that the space occupied by it per unit axial length decreases progressively from one end to the other of said chamber, whereby to accommodate the expanding bulk of the liquid as it becomes froth during its passage along the chamber.

5. Beating apparatus for viscous liquids comprising a relatively long, straight and horizontally-disposed aerating chamber open at both ends, means to introduce air and a stream of viscous liquid into one open end thereof, and beating means disposed within said chamber having provision for whipping the liquid into a froth and propelling the froth toward the other open end of the chamber, said beating and propelling means having provision for accommodating the expanding bulk of the material as it forms froth during its traverse of the chamber.

6. Beating apparatus for viscous liquids comprising a relatively long and horizontally-disposed tube open for its full diameter at both ends and having means for introducing streams of material and air into the tube at one open end, and beating means disposed within said tube to whip the liquid in contact with the air within the tube and form a froth of the liquid and simultaneously propel the froth toward the other open end of the tube.

7. Beating apparatus for viscous liquids comprising a relatively long tube open at both ends, a beating device disposed within the tube arranged to whip the liquid into a froth, an air-forcing device disposed within one open end of said tube adjacent said beating device, and means for introducing a stream of viscous liquid into the tube between said beating device and air-forcing device.

8. Beating apparatus for viscous liquids comprising a relatively long tube open at both ends, a rotatable shaft extended longitudinally within the tube and having whipping means extended laterally of the shaft and along the major part of the length of said tube, said whipping means adapted to whip the liquid to a froth, an air impeller disposed within said tube adjacent an open end thereof and fixed to said shaft adjacent said whipping means, and means to introduce a stream of liquid to be beaten to a froth into said tube and to said impeller.

9. Beating apparatus for viscous liquids comprising a tube having a discharge opening for the beaten liquid at one end and an opening for the introduction of liquid to be beaten and air at the other end and a beating device rotatably disposed within said tube comprising a shaft rotatably disposed within said tube and an open spiral coil fixed to and disposed about said shaft in a plurality of axially-disposed convolutions.

10. Beating apparatus for viscous liquids comprising a tube having a discharge opening for the beaten liquid at one end and an opening for the introduction of liquid to be beaten and air at the other end and a beating device rotatably disposed within said tube comprising a shaft rotatably disposed within said tube and an open spiral coil fixed to and disposed about said shaft in a plurality of axially-disposed convolutions which are spaced closer together at one end than at the other end of the shaft.

11. Beating apparatus for viscous liquids comprising a tube having a discharge opening for the beaten liquid at one end and an opening for the introduction of liquid to be beaten and air at the other end and a beating device rotatably disposed within said tube comprising a shaft rotatably disposed within said tube and an open spiral coil fixed to and disposed about said shaft in a plurality of axially-disposed convolutions, the spacing of which convolutions varies from one end to the other.

12. Beating apparatus for viscous liquids comprising a tube having a discharge opening for the beaten liquid at one end and an opening for the introduction of liquid to be beaten and air at the other end and a beating device rotatably disposed within said tube comprising a shaft rotatably disposed within said tube and an open spiral coil fixed to and disposed about said shaft in a plurality of axially-disposed convolutions, the spacing of which convolutions increases approximately uniformly from one end to the other end of the shaft.

13. Beating apparatus for viscous liquids comprising a tube having a discharge opening for the beaten liquid at one end and an inlet opening for the liquid to be beaten at the other end, a beating device disposed within said tube between said openings comprising a shaft rotatably disposed within said tube and a spiral coil fixed to and disposed about said shaft in a plurality of axially-disposed convolutions, and means to direct a stream of air into said tube to flow forward, said liquid inlet and said beating device.

14. Beating apparatus for viscous liquids comprising a tube having a discharge opening for the beaten liquid at one end and an inlet opening for the liquid to be beaten at the other end, a beating device disposed within said tube between said openings comprising a shaft rotatably disposed within said tube and a spiral coil fixed to and disposed about said shaft in a plurality of axially-disposed convolutions at one side of said liquid inlet opening, and an air impeller fixed to said shaft and disposed within said tube and on the other side of the liquid inlet opening.

15. Beating apparatus for viscous liquids comprising a tube having a discharge opening for the beaten liquid at one end and an inlet opening for the liquid to be beaten at the other end, a beating device disposed within said tube between said openings comprising a shaft rotatably disposed within said tube and a spiral coil fixed to and disposed about said shaft in a plurality of axially-disposed convolutions at one side of the liquid inlet opening, the spacing of said convolutions increasing approximately progressively from the liquid inlet toward the discharge opening of the tube, and an air impeller fixed to said shaft and disposed within the tube on the other side of the liquid inlet opening.

16. A continuous egg beater comprising a horizontal tube which is open to the air at one end and has an outlet passage for the egg froth at its other end, means to introduce a small continuous stream of egg liquid into the open end of said tube, and a rotatable beating device disposed within said tube at the entrance of the continuous stream of egg liquid thereto, and extended along the tube toward the outlet passage, said beating device having whipping elements which cut across and churn the stream of egg liquid and the air within the tube and convert the egg liquid into a froth which is discharged at the outlet passage.

In testimony whereof, I have signed my name to this specification.

DALE G. STEELY.